United States Patent [19]

Hopkin

[11] 4,048,282

[45] Sept. 13, 1977

[54] SOLVENT EXTRACTION OF COPPER WITH DILUTION OF THE ORGANIC PHASE

[75] Inventor: William Hopkin, Bristol, England

[73] Assignees: Metallurgical Processes Limited, Nassau, Bahamas; I.S.C. Smelting Limited of London, London, England

[21] Appl. No.: 602,023

[22] Filed: Aug. 5, 1975

[30] Foreign Application Priority Data

Aug. 23, 1974 United Kingdom ............... 37096/74

[51] Int. Cl.$^2$ ............................................... C01G 3/00
[52] U.S. Cl. ................................................. 423/24
[58] Field of Search ........................... 423/24, 100, 33; 75/101 BE, 117

[56] References Cited

U.S. PATENT DOCUMENTS

| | | | |
|---|---|---|---|
| 3,761,249 | 9/1973 | Ritcey et al. | 75/117 |
| 3,853,981 | 12/1974 | Hadzeriga | 423/24 |
| 3,867,506 | 2/1975 | Skarbo | 423/24 |
| 3,907,966 | 9/1975 | Skarbo | 75/101 BE |
| 3,971,652 | 7/1976 | Bryson | 423/33 |

*Primary Examiner*—O. R. Vertiz
*Assistant Examiner*—Brian E. Hearn
*Attorney, Agent, or Firm*—Holman & Stern

[57] ABSTRACT

A method of extracting copper from an aqueous ammoniacal leach solution which is derived from the leaching of copper dross and which contains impurity cations, comprising contacting the leach solution with a copper-selective organic phase to take copper into the organic phase and then stripping the copper from the organic phase into an aqueous phase, the organic phase being washed with a dilute acid before stripping, wherein before the organic phase is washed with the dilute acid the concentration of copper in the organic phase is reduced below a level at which poor phase separation occurs under acid conditions.

4 Claims, No Drawings

SOLVENT EXTRACTION OF COPPER WITH DILUTION OF THE ORGANIC PHASE

This invention relates to the solvent extraction of copper, and more particularly to the selective solvent extraction of copper from aqueous ammoniacal solutions.

The present invention is concerned with improvements in or modifications of the method described in British Patent Specification No. 1,399,281 which relates to the recovery of copper values from pyro-metallurgically produced lead bullion by leaching with aqueous ammoniacal solutions containing carbonate ions. British Patent Specification No. 1,399,281 particularly relates to a method of leaching copper values from copper dross obtained from pyrometallurgical lead bullion, by contacting finely-divided particles of the copper dross in the form of a metallic lead matrix containing copper and copper compound inclusions with an aqueous solution of ammonium carbonate and ammonium hydroxide to dissolved copper from the dross, the leaching solution preferably further containing sulphate ions and the mole ratio of carbonate to sulphate in the leaching solution being preferably from 1:3 to 3:1.

The resulting leachate solutions contain appreciable concentrations of zinc and lead in addition to copper. The copper may be subsequently loaded into a solution of a copper-selective organic extractant, especially an extractant of the hydroxy-oxime type, for example LIX 64N or 65N (Registered Trade Mark of General Mills Inc.), in a hydrocarbon such as kerosene, and then stripped from this extractant solution with a dilute aqueous acid such as sulphuric acid to give a copper salt solution. The compositions of the LIX extractants and other copper-selective organic extractants are set forth in "Solvent Extraction in Copper Hydrometallurgy" by D. S. Flett, Institution of Mining and Metallurgy, March 1974, pages C30–C38. The extractant solution in kerosene is referred to hereinafter as the "organic phase".

However, during the loading of the organic phase substantial amounts of zinc, lead and ammonium ions may be taken into the organic phase, the actual amounts depending on the sulphate/carbonate ratio and the ratio of actual to theoretical loading of copper into the organic phase. In the subsequent stripping operation, zinc and ammonia are also taken into the aqueous acid, thus giving a copper salt solution contaminated with zinc, ammonia and lead. Where sulphuric acid is used for stripping, the lead tends to precipitate as the sulphate at the organic phase/aqueous phase interface, thus complicating the subsequent separation of these two phases.

A preliminary wash of the copper-loaded organic phase with very dilute sulphuric acid substantially removes the zinc and ammonia into the wash solution and precipitates lead sulphate, leaving copper as the only major cation to be stripped into the aqueous phase, the aqueous copper solution being subsequently utilized to produce cathode copper or a copper salt.

Alternatively, a wash with a dilute aqueous acid the lead salts of which are substantially water-soluble, for example hydrochloric acid or nitric acid, can remove substantially all the cationic impurities as dissolved salts, thus avoiding the problem of lead sulphate precipitation. However, use of these acids means that sufficient acid anion is taken into solution in the organic phase to make necessary a water wash to subsequently remove the acid anion, so as to avoid the deleterious effects of these anions on the subsequent electrolytic recovery of the copper from the stripping solution.

It is therefore desirable to limit as far as possible the loading of impurity cations into the organic phase. One way in which this can be achieved is to load into the organic phase as much copper as it can hold, while still permitting clean phase separation. In practice about 0.3 g/l of copper for each 1% v/v of organic extractant in kerosene may be loaded using the extractants known as LIX 64N or LIX 65N. (LIX is a Registered Trade Mark of General Mills Inc.) when loading from an ammoniacal solution. This reduces, but does not eliminate, the loading of ammonium and other cations and a dilute acid wash is still necessary to remove these cations. However, when loading the organic phase two phenomena occur which are not completely understood. First, an intermediate or third phase is observed between the organic and aqueous phases. This is probably a precipitate containing solid copper oximes but it may be due to incomplete separation of phases. Second, excessive copper transfer to the aqueous phase occurs during the dilute aqueous acid wash. This is apparently due in some way to the difference between the copper loading from the ammoniacal solution at about 0.3 g/l for each 1% v/v of extractant in kerosene and the copper loading from the acid solution of about 0.27 g/l for each 1% v/v at a pH of about 4. Thus in the acid solution the loading capacity of the organic phase is decreased, some copper is extracted in the washing stage, and the copper loading at which clean phase separation is achieved under acid conditions is exceeded. It is not known whether this non-separation is due to copper complex precipitation or inhibition of phase separation, or both.

It is an object of the present invention to prevent the formation of this third phase and also the transfer of excessive amounts of copper to the aqueous wash acid solution from the highly loaded copper organic phase, so as to permit a clean separation of phases during loading of the organic phase.

The present invention provides a method of extracting copper from an aqueous ammoniacal leach solution which is derived from the leaching of copper dross and which contains impurity cations, comprising contacting the leach solution with a copper-selective organic phase to take copper into the organic phase and then stripping the copper from the organic phase into an aqueous phase, the organic phase being washed with a dilute acid before stripping, wherein before the organic phase is washed with the dilute acid the concentration of copper in the organic phase is reduced below a level at which poor phase separation occurs under acid conditions.

The copper concentration is preferably reduced by diluting the copper-loaded organic phase with some fresh organic phase or some organic phase previously stripped of copper. Thus the non-separation of phases previously referred to may be avoided if the copper concentration in the copper-loaded organic phase is diluted with substantially copper-free organic phase before the copper-loaded organic phase first contacts the aqueous dilute acid solution in the washing stage.

The reduction of the copper concentration is preferably achieved by mixing with the copper-loaded organic phase some organic phase which has been previously stripped of copper. Conveniently, a bleed of organic phase stripped of copper may be re-circulated from the end of the stripping step into the copper-loaded organic phase immediately before the copper-loaded organic phase is washed with the dilute acid.

Preferably the copper concentration in the organic phase is reduced by from 5% to 20%, more preferably by at least 10%, during the dilution stage.

It is undesirable to decrease the copper concentration too much since the volume of the organic phase and hence the equipment size increases without corresponding gain. About 0.5 to 2 volumes of re-cycled organic phase stripped of copper may conveniently be used per 10 volumes of the copper-loaded organic phase and this is sufficient to achieve the necessary dilution of copper. Thus, typically, using LIX 64N or LIX 65N as the copper-selective organic extractant the copper concentration may be reduced from about 0.3 g/l per 1% v/v extractant in kerosene to 0.25 to 0.27 g/l per 1% v/v extractant in kerosene and this is sufficient to achieve the desired result.

The invention will be further described with reference to the following illustrative Example.

During a 5-day pilot plant run operating on ammoniacal leach liquor derived from the leaching of copper dross and using LIX 65N in Escaid 100 (Registered Trade Mark of Esso Chemical Ltd.) as the copper-selective organic phase, an attempt was made to crowd load copper into the organic phase to reduce the impurity cation load in the organic phase, and also to eliminate the side effects due to high copper-in-organic phase concentration by passing a fraction (10% or 20% by volume) of the total organic phase used for extraction directly to dilute the copper-loaded organic phase, i.e. by-passing the extraction stage altogether. By crowd loading is meant loading the organic phase with the maximum possible amount of copper, i.e. saturating the organic phase with copper.

Table 1 shows how the copper content of the aqueous wash solution changes as the operation of organic phase extraction stage changes from no crowding to crowding with 10% dilution and to crowding with no dilution. Table 2 shows a similar set of results with a 20% dilution. The concentration of copper in SAC (stripped ammonium carbonate solution) is used as a measure of the extent of crowd loading.

transfer into the wash solution in the case of 10% dilution. The 20% dilution also virtually eliminated the formation of tar in the washing stage.

The above results illustrate the following:
1. high copper loading into the copper-selective organic phase gives low zinc loading into the organic phase;
2. high copper loading into the copper-selective organic phase tends to offload high copper into acid solutions, due to the difference between maximum specific loading of about 0.27 g/lCu in 1% v/v LIX 65N in acid conditions and about 0.30 g/lCu in ammoniacal conditions;
3. high copper in S. A. C. implies crowd loading, and the coincidence of high copper in S. A. C. and in the wash solution certainly indicates crowd loading; and
4. in these tests 10% dilution was insufficient to reduce the copper in the wash solution to a desired level but 20% dilution was sufficient to do this.

I claim:

1. In a method of extracting copper from an aqueous ammoniacal leach solution which is derived from the leaching of copper dross and which contains impurity cations, comprising contacting the leach solution with a copper-selective organic phase comprising a copper selective hydroxy-oxime organic extractant in an organic diluent to take copper into the organic phase to form a highly loaded copper organic phase, washing the highly loaded copper organic phase with a dilute acid and stripping the copper from the washed highly loaded copper organic phase into an aqueous phase, the improvement comprising reducing the concentration of copper in the copper-loaded organic phase by from 5% to 20% before the highly loaded copper organic phase is washed with the dilute acid.

2. The method according to claim 1 wherein the reducing step comprises mixing fresh copper-selective organic phase comprising a copper-selective hydroxy-oxime organic extractant in an organic diluent with the highly loaded copper organic phase.

3. The method according to claim 1 wherein the reducing step comprises mixing organic phase previously stripped of copper with the highly loaded copper or-

TABLE 1

| Run | % Organic Phase used in dilution | g/l Cu in Organic Phase | g/l Cu in S.A.C. | g/l Cu in Wash | mg/l Zn in Organic Phase | Comment |
| --- | --- | --- | --- | --- | --- | --- |
| 1 | 0 | 5.16 | 0.02 | 0.07 | 100 | No crowding |
| 2 | 10 | 6.96 | 0.13 | 0.27 | 6 | crowding |
| 3 | 10 | 6.80 | 0.57 | 4.93 | 6 | crowding |

TABLE 2

| Run | % Organic Phase used in dilution | g/l Cu in Organic Phase | g/l Cu in S.A.C. | g/l Cu in Wash | mg/l Zn in Organic Phase | Comment |
| --- | --- | --- | --- | --- | --- | --- |
| 1 | 0 | 7.63 | 0.13 | 0.05 | 37 | No crowding |
| 2 | 20 | 8.10 | 3.09 | 0.68 | 16 | crowding |
| 3 | 20 | 8.75 | 7.61 | 0.79 | 12 | crowding |
| 4 | 20 | 9.30 | 5.93 | 0.99 | 42 | crowding |

Table 1 shows how the loading of zinc into the copper-selective organic phase is decreased by employing crowd loading of copper into the organic phase, together with 10% dilution of the copper-loaded organic phase.

Table 2 shows that the copper transfer into the wash solution is effectively decreased by 20% dilution of the copper-loaded organic phase compared with copper ganic phase.

4. The method according to claim 3 comprising recirculating a bleed of organic phase stripped of copper from the end of the stripping step into the copper-loaded organic phase before the highly loaded copper organic phase is washed with the dilute acid.

* * * * *

UNITED STATES PATENT AND TRADEMARK OFFICE
CERTIFICATE OF CORRECTION

PATENT NO. : 4,048,282
DATED : September 13, 1977
INVENTOR(S) : WILLIAM HOPKIN

It is certified that error appears in the above-identified patent and that said Letters Patent are hereby corrected as shown below:

[73] Assignment:

Metallurgical Processes Limited and I.S.C. Smelting Limited carrying on business together in the Bahamas under the name and style of Metallurgical Development Company Signed and Sealed this Twenty-first Day of February 1978

[SEAL]

Attest:

RUTH C. MASON
*Attesting Officer*

LUTRELLE F. PARKER
*Acting Commissioner of Patents and Trademarks*